(12) United States Patent
Nagaya et al.

(10) Patent No.: US 7,656,143 B2
(45) Date of Patent: Feb. 2, 2010

(54) DC-DC CONVERTER

(75) Inventors: Yoshihiro Nagaya, Kasugai (JP); Takashi Matsumoto, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 35 days.

(21) Appl. No.: 11/826,261

(22) Filed: Jul. 13, 2007

(65) Prior Publication Data
US 2008/0012546 A1 Jan. 17, 2008

(30) Foreign Application Priority Data
Jul. 13, 2006 (JP) .............................. 2006-192600

(51) Int. Cl.
*G05F 1/00* (2006.01)
*G05B 24/02* (2006.01)
(52) U.S. Cl. ..................... 323/288; 323/284; 323/326
(58) Field of Classification Search ................. 323/282, 323/283, 284, 288, 326, 351
See application file for complete search history.

(56) References Cited

U.S. PATENT DOCUMENTS 6,069,471 A * 5/2000 Nguyen ....................... 323/271
7,098,639 B2 * 8/2006 Natsume et al. ............. 323/282
2002/0190701 A1* 12/2002 Miyazaki ..................... 323/284

FOREIGN PATENT DOCUMENTS

JP 7-222439 8/1995
JP 2004-173460 6/2004

OTHER PUBLICATIONS

Vitezlav Benda et al., "Power Semiconductor Devices Theory and Applications", John Wiley&Sons, 1999.
B. Jayant Baliga, "Power Semiconductor Devices", PWS Publishing Company, 1996.

* cited by examiner

*Primary Examiner*—Jessica Han
*Assistant Examiner*—Emily Pham
(74) *Attorney, Agent, or Firm*—Arent Fox LLP

(57) ABSTRACT

To present a DC-DC converter efficient in conversion and not requiring an external diode. The DC-DC converter includes a main NMOS transistor FET1 as a main switching device, a driver DVH1 for driving a gate terminal of the main NMOS transistor FET1, a capacitor C2 connected between a source terminal of the main NMOS transistor FET1 and a power source terminal of the driver DVH1, and an NMOS transistor FET3 connected between a route leading to an input power source and the power source terminal of the driver DVH1. The NMOS transistor FET3 does not conduct when the main NMOS transistor FET1 conducts, and conducts when the main NMOS transistor FET1 does not conduct.

14 Claims, 11 Drawing Sheets

CIRCUIT DIAGRAM SHOWING STRUCTURE OF DC-DC CONVERTER
DIRECTED TO FIRST EMBODIMENT

FIG. 1 CIRCUIT DIAGRAM SHOWING STRUCTURE OF DC-DC CONVERTER DIRECTED TO FIRST EMBODIMENT

FIG. 2  TIMING CHART SHOWING TIMING OF FET1~FET3

EXEMPLARY DIAGRAM SHOWING CIRCUIT OPERATION
COPING WITH STATE OF EACH FET

EXEMPLARY DIAGRAM SHOWING CIRCUIT OPERATION
COPING WITH STATE OF EACH FET

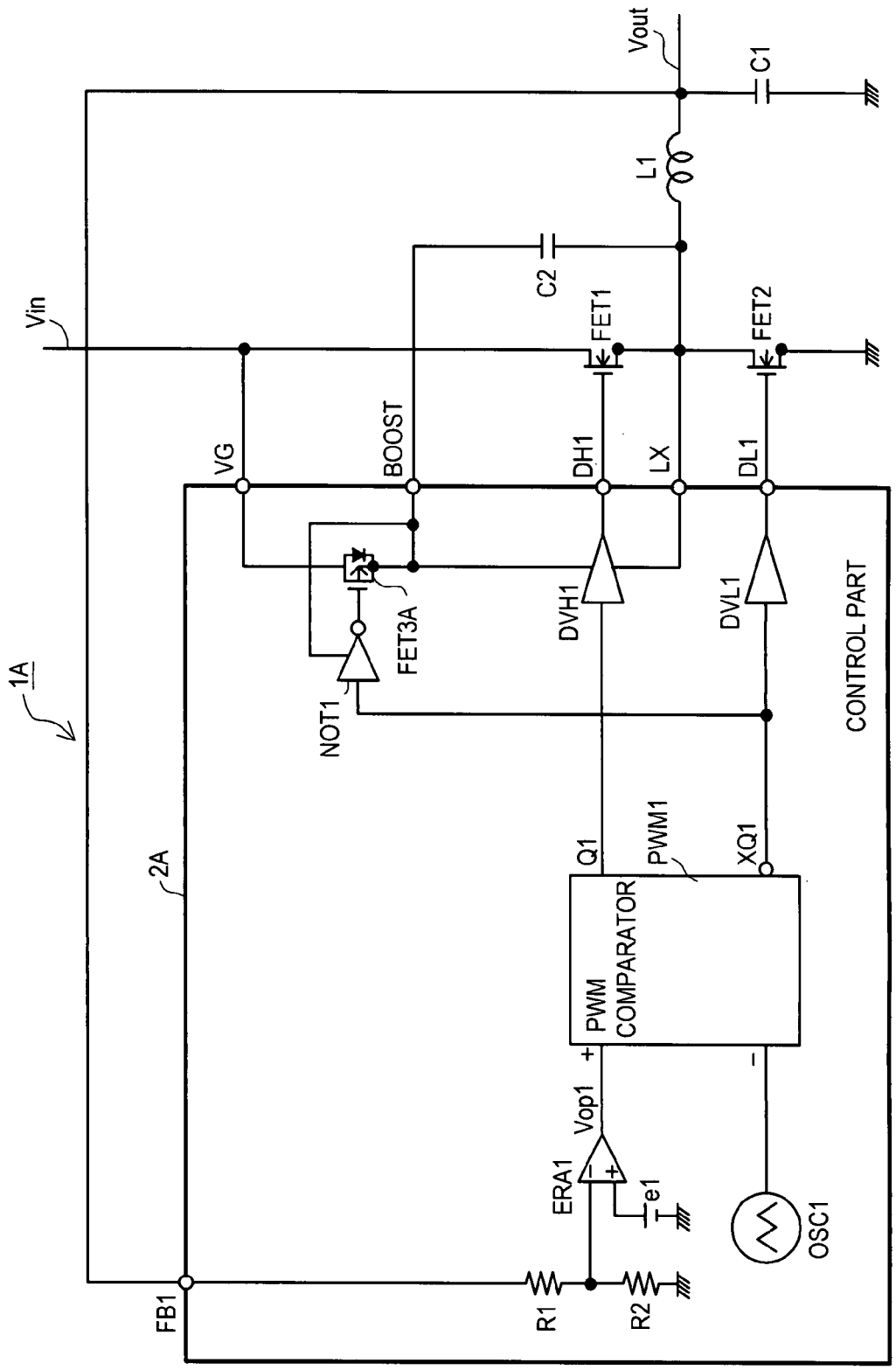
FIG. 5  CIRCUIT DIAGRAM SHOWING STRUCTURE OF DC-DC CONVERTER DIRECTED TO SECOND EMBODIMENT

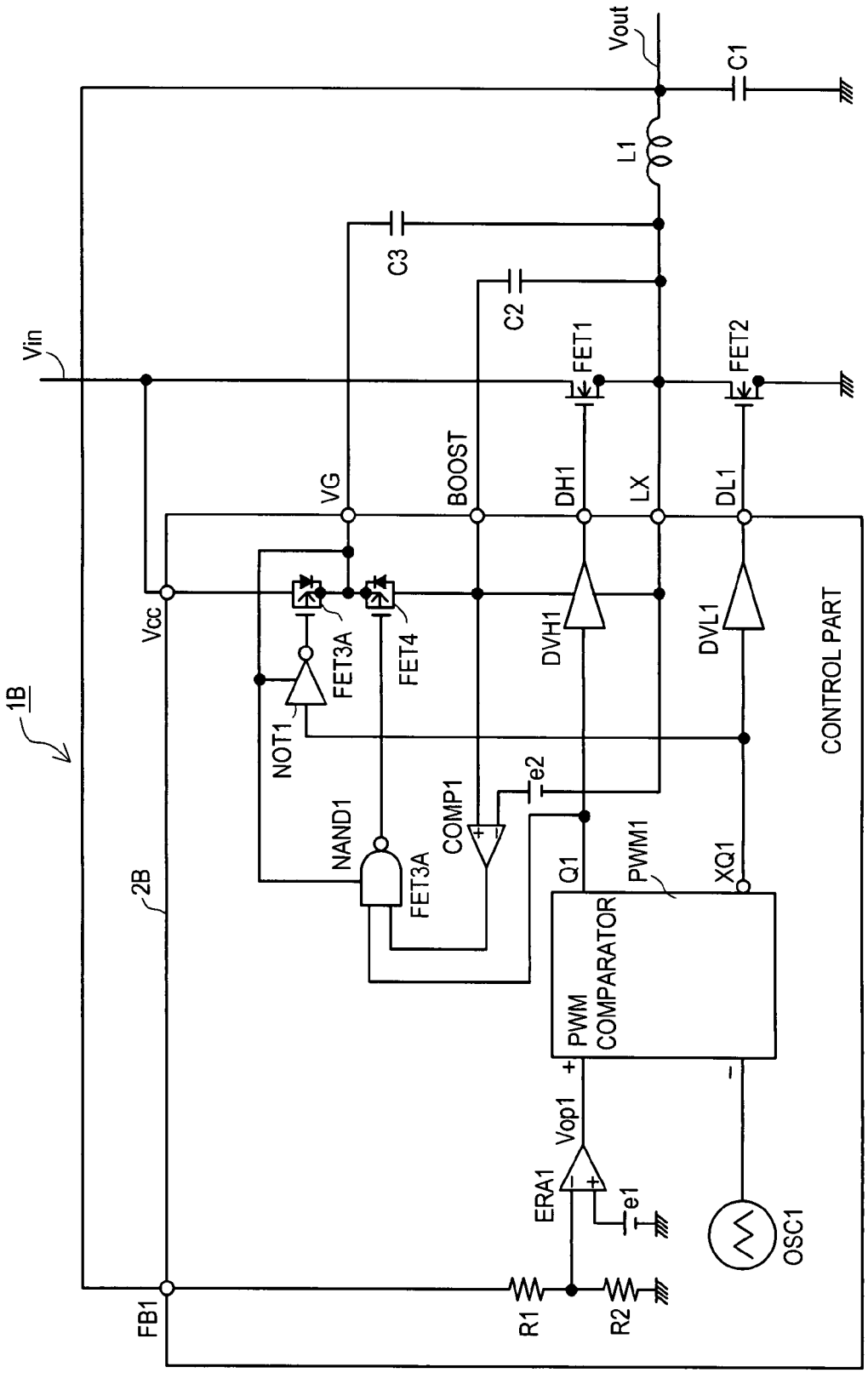
FIG. 6 CIRCUIT DIAGRAM SHOWING STRUCTURE OF DC-DC CONVERTER DIRECTED TO THIRD EMBODIMENT FIG. 7  EXEMPLARY DIAGRAM SHOWING CIRCUIT OPERATION COPING WITH STATE OF EACH FET
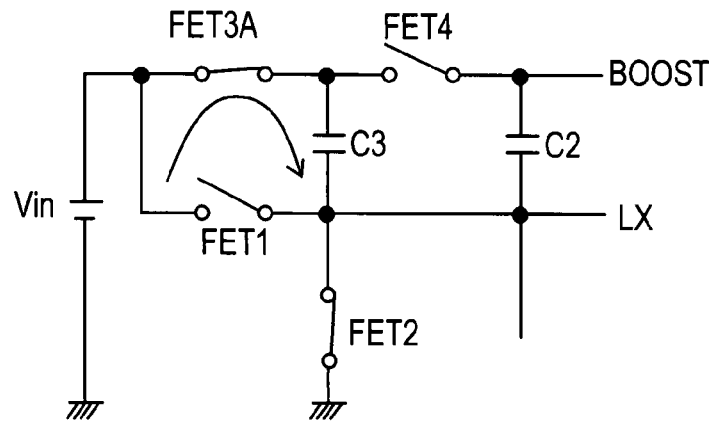
FIG. 8  EXEMPLARY DIAGRAM SHOWING CIRCUIT OPERATION COPING WITH STATE OF EACH FET
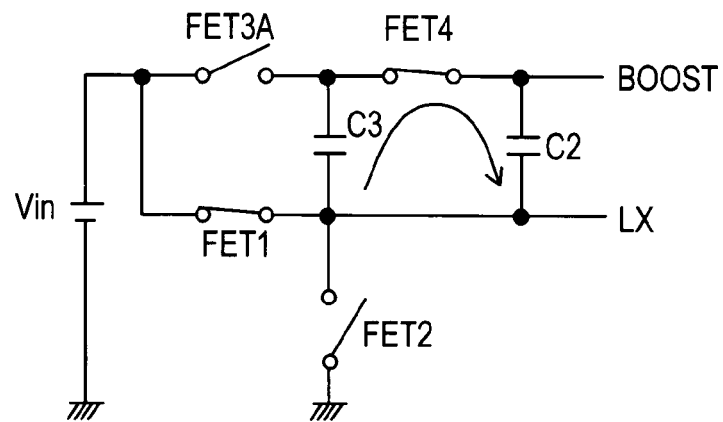
FIG. 9  EXEMPLARY DIAGRAM SHOWING GENERATION OF GATE VOLTAGE OF FET1
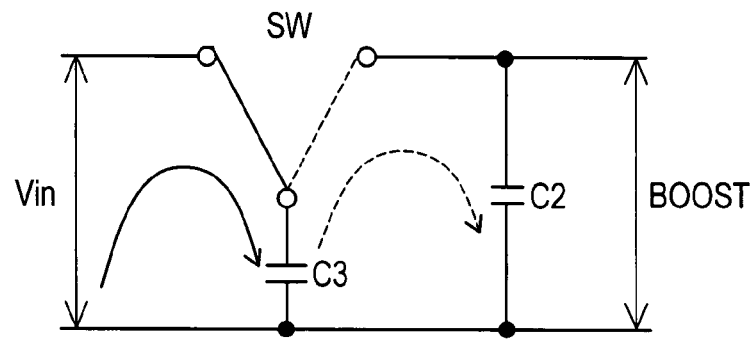

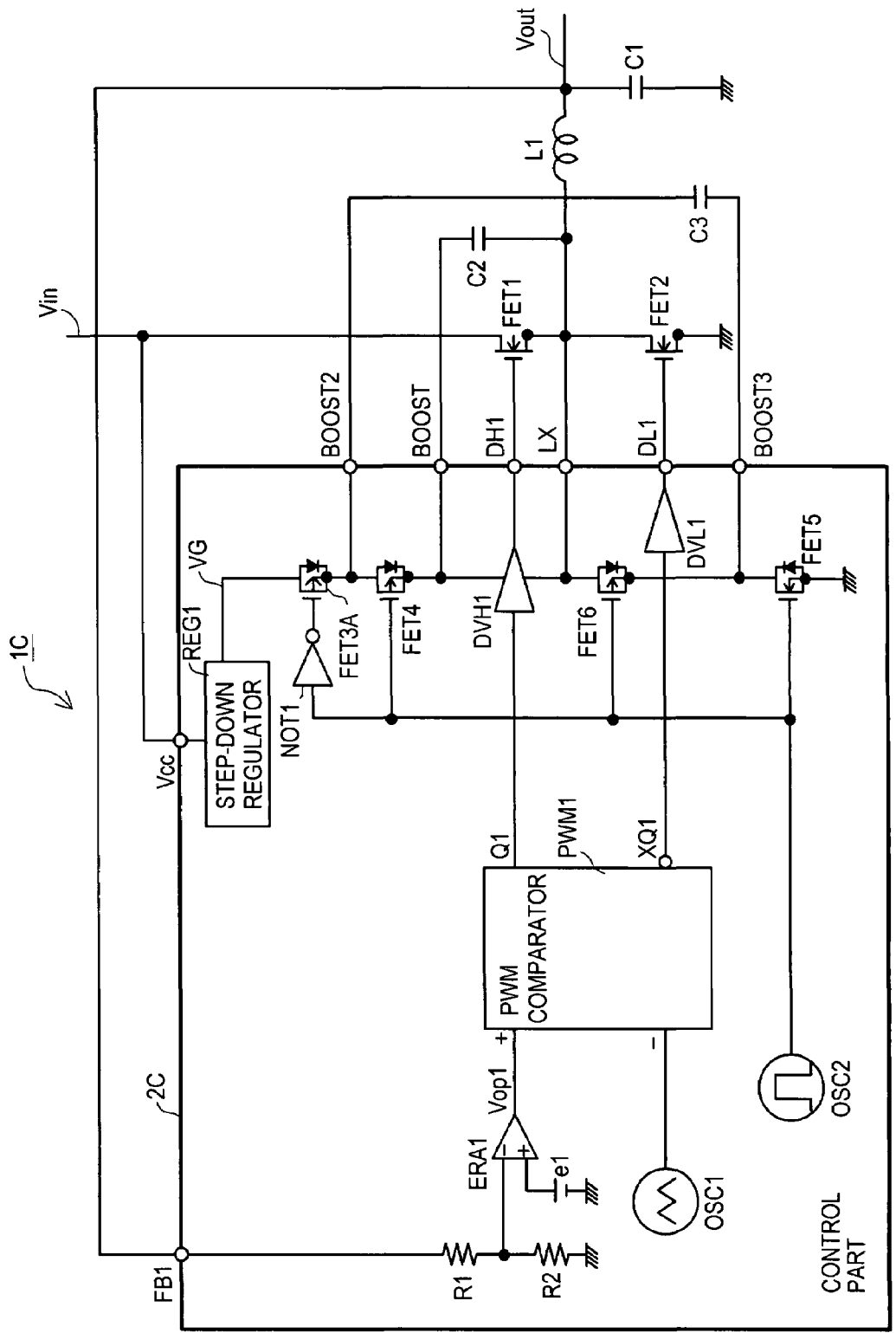
FIG. 10 CIRCUIT DIAGRAM SHOWING STRUCTURE OF DC-DC CONVERTER DIRECTED TO FOURTH EMBODIMENT

EXEMPLARY DIAGRAM SHOWING CIRCUIT OPERATION COPING WITH STATE OF EACH FET

EXEMPLARY DIAGRAM SHOWING CIRCUIT OPERATION COPING WITH STATE OF EACH FET

EXEMPLARY DIAGRAM SHOWING CIRCUIT OPERATION COPING WITH STATE OF EACH FET

EXEMPLARY DIAGRAM SHOWING CIRCUIT OPERATION COPING WITH STATE OF EACH FET

CIRCUIT DIAGRAM SHOWING STRUCTURE OF CONVENTIONAL DC-DC CONVERTER

TIMING CHART SHOWING OPERATION WAVE OF CONTROL PART IN DC-DC CONVERTER

DC-DC CONVERTER

CROSS-REFERENCE TO RELATED APPLICATIONS

This application is based upon and claims the benefit of priority from the prior Japanese Patent Application No. 2006-192600 filed on Jul. 13, 2006, the entire contents of which are incorporated herein by reference.

BACKGROUND OF THE INVENTION

1. Field of the Invention

The invention relates to a DC-DC converter, and more particularly to a DC-DC converter using an N-type FET in a main switching device.

2. Description of the Related Art

As one of the methods for improving the efficiency in a DC-DC converter of a switching regulator system, it is proposed to use an N-type FET in a main switching device. As compared with use of a P-type FET in a main switching device, conduction resistance can be decreased to about 42% if the size is the same, which contributes greatly to improvement of efficiency in the DC-DC converter.

To use an N-type FET as a main switching device of a DC-DC converter, the gate driving voltage of the N-type FET is required to be higher than the input voltage to the source terminal. As means for generating such high gate driving voltage, it is general to use a charge pump circuit using an FET of a synchronous rectifier circuit.

FIG. 15 is a circuit diagram of a DC-DC converter 100 using a charging pump circuit of prior art. The DC-DC converter 100 is built in an electronic appliance (such as a notebook computer), and converts a power source input voltage Vin from a battery not shown, and outputs an output voltage Vout for operating the CPU and peripheral devices.

The DC-DC converter 100 is composed of a control part 102 formed on a one-chip semiconductor integrated circuit, and a plurality of external devices.

A first drive signal DH1 of the control part 102 is supplied to a gate terminal of a main NMOS transistor FET1, and the power source input voltage Vin is inputted to a drain terminal of the main NMOS transistor FET1. A source terminal of the main NMOS transistor FET1 is connected to a drain terminal of a synchronous rectifier NMOS transistor FET2. A second drive signal DL1 of the control part 102 is supplied to a gate terminal of the synchronous rectifier NMOS transistor FET2, and a source terminal of the synchronous rectifier NMOS transistor FET2 is connected to a grounding potential.

A source terminal of the main NMOS transistor FET1 is connected to an output terminal 103 by way of a choke coil L1. The output terminal 103 is connected to the grounding potential by way of a smoothing capacitor C1.

The control part 102 includes potential resistances R1, R2, an error amplifier ERA1, a triangular wave oscillator OSC1, a PWM comparator PWM1, and drivers DVH1, DVL1, and outputs a first drive voltage DH1 and a second drive signal DL1, and thereby controls the main NMOS transistor FET1 and the synchronous rectifier NMOS transistor FET2.

In the control part 102, the output voltage Vout is divided by the potential resistances R1, R2, and the divided voltage is inputted to an inverting input terminal of an error amplifier ERA1. A reference voltage e1 is inputted to a non-inverting input terminal of the error amplifier ERA1. The error amplifier ERA1 compares the divided voltage depending on the output voltage Vout and the reference voltage e1, and amplifies the voltage difference, and outputs an output signal Vop1.

FIG. 16 is a timing chart showing the operation waveform in the control part 102.

In the control part 102, the voltage of an output signal Vop1 of the error amplifier ERA1 is large in variation when the voltage difference is greater between the divided voltage depending on the output voltage Vout (divided voltage by potential resistances R1, R2) and the reference voltage e1, and is small in variation when the voltage difference is smaller between the divided voltage and the reference voltage e1.

The PWM comparator PWM1 sets an output signal Q1 at a high level when the triangular wave signal is lower than the output voltage Vop1 of the error amplifier ERA1, and sets Q1 at a low level when the triangular wave signal is higher than the output voltage Vop1. Therefore, when the voltage of the output voltage Vop1 of the error amplifier ERA1 elevates, the output pulse width of the PWM comparator PWM1 (the pulse width for setting the output signal Q1 at a high level) becomes longer.

The output signal Q1 of the PWM comparator PWM1 is inputted to the gate terminal of the main NMOS transistor FET1 through the driver DVH1 as the first drive voltage DH1. Accordingly, when the output pulse width of the PWM comparator PWM1 becomes longer, the conduction time of the main NMOS transistor FET1 becomes longer, and to the contrary, when the output pulse width of the PWM comparator PWM1 becomes shorter, the conduction time of the main NMOS transistor FET1 becomes shorter.

In the DC-DC converter 100, conduction and non-conduction of the main NMOS transistor FET1 are controlled so that the output voltage Vout may be a constant voltage determined by the reference voltage e1 and the potential resistances R1, R2, depending on the output signal Q1 of the PWM comparator PWM1.

The PWM comparator PWM1 outputs an output signal XQ1 for inverting the logic level of the output signal Q1. That is, the output signals Q1, XQ1 are outputted from the PWM comparator PWM1 as mutually complementary pulse signals. The output signal XQ1 from the PWM comparator PWM1 is supplied in the gate terminal of the synchronous rectifier NMOS transistor FET2 as the second drive signal DL1 by way of the driver DVL1.

Therefore, the synchronous rectifier NMOS transistor FET2 does not conduct while the main NMOS transistor FET1 is conducting, and the synchronous rectifier NMOS transistor FET2 conducts while the main NMOS transistor FET1 is not conducting. That is, by the first drive voltage DH1 and the second drive voltage DL1 outputted from the control part 102, the main NMOS transistor FET1 and the synchronous rectifier NMOS transistor FET2 conduct alternately.

By the switching operation of the main NMOS transistor FET1, the output current of the main NMOS transistor FET1 is smoothed by the choke coil L1 and a smoothing capacitor C1. While the main NMOS transistor FET1 is conducting, the power source input voltage Vin is supplied to the smoothing circuit composed of the choke coil L1 and the smoothing capacitor C1 by way of main NMOS transistor FET1. When the main NMOS transistor FET1 is not conducting, the electromagnetic gain energy accumulated in the choke coil L1 while the main NMOS transistor FET1 is conducting is released to the output terminal 103 side.

The output voltage Vout of the output terminal 103 is expressed in the following formula.

$$Vout = Vin \times Ton/(Ton + Toff)$$

where Ton is the conducting period of the main NMOS transistor FET1, and Toff is the non-conducting period of the main NMOS transistor FET1.

Therefore, if the power source input voltage Vin fluctuates due to a battery consumption or an operating environment of electronic appliances, by controlling the duty cycle of the output signal Q1, it may be compensated so that the output voltage Vout may be kept at a constant voltage.

Since an N type FET is used in the main NMOS transistor FET1 of the DC-DC converter 100, a voltage higher than the power source input voltage Vin is needed as the first drive voltage DH1 for driving the main NMOS transistor FET1. Accordingly, in the DC-DC converter 100, by making use of the phenomenon of amplitude of the source potential within the power source input voltage Vin when the main NMOS transistor FET1 conducts and does not conduct, the driving voltage of the gate terminal of the main NMOS transistor FET1 is generated by the charge pump.

The output signal Q1 of the PWM comparator PWM1 is inputted in the gate terminal of the main NMOS transistor FET1 as the first drive voltage DH1 through the driver DVH1, and the output signal XQ1 is supplied in the gate terminal of the synchronous rectifier NMOS transistor FET2 as the second drive voltage DL1 through the driver DVL1.

Between the source and drain of the main NMOS transistor FET1, a series circuit of a diode D1 and a capacitor C2 is connected in parallel. Herein, the cathode of the diode D1 is connected to the capacitor C2, and its junction is connected to the power source terminal of the driver DVH1.

In this DC-DC converter 100, while the main NMOS transistor FET1 is not conducting and the synchronous rectifier NMOS transistor FET2 is conducting, the source potential of the main NMOS transistor FET1 is a grounding potential. At this time, a current flows into the capacitor C2 by way of the diode D1, and the capacitor C2 is charged until its voltage becomes equal to the power source input voltage Vin.

At the next transition, the main NMOS transistor FET1 is conducting and the synchronous rectifier NMOS transistor FET2 is not conducting, the source potential of a main NMOS transistor FET1 elevates, and the potential of the terminal BOOST capacitively coupled by the capacitor C2 becomes higher than the power source input voltage Vin. A voltage higher than the power source input voltage Vin is applied to the gate terminal of the main NMOS transistor FET1 by way of the driver DVH1 having the power source terminal connected to the terminal BOOST, and therefore the main NMOS transistor FET1 conducts completely.

At this time, the diode D1 prevents the charge of the capacitor C2 of which voltage is higher than the power source input voltage Vin from flowing reversely into the power source input voltage Vin. The diode D1 is generally realized by a Schottky diode of which forward electromotive force Vf is smaller than that of an ordinary diode.

In the diode D1, however, since the power consumption occurs for the portion of forward electromotive force Vf when charging the capacitor C2, the efficiency of the DC-DC converter is lowered. Further, for the portion of forward electromotive force Vf, the potential charged in the capacitor C2 is lowered. Assuming to incorporate the diode D1 at the control circuit side of one-chip semiconductor device, the existing process for forming a Schottky diode is complicated.

SUMMARY OF THE INVENTION

It is an object to resolve these problems of the background art, and to present a DC-DC converter high in conversion efficiency, not requiring external diode.

To achieve the above object, there is provided a DC-DC converter comprising a main NMOS transistor constituting a main switching device; a driver for driving a gate terminal of the main NMOS transistor; a first capacitance connected between a source terminal of the main NMOS transistor and a power source terminal of the driver; and a first switching device connected between a path to reach an input power source and the power source terminal of the driver; wherein the first switching device is made non-conductive when the main NMOS transistor is conductive, and the first switching device is made conductive when the main NMOS transistor is non-conductive.

According to the above DC-DC converter, when the main NMOS transistor is non-conductive, the first switching device is made conductive so that the first capacitance can be charged. When the main NMOS transistor is conductive, the first switching device is made non-conductive so that counter flow from the first capacitance to the input power source side can be prevented.

By employing the first switching device, forward direction electromotive force can be lowered in comparison with the case of employing a Schottky diode. Therefore, the employment of the first switching device makes it possible to reduce power waste due to forward direction electromotive force and to prevent lowering of charge voltage with reference to its capacity. Furthermore, the first switching device is easier to be built in an LSI than a Schottky diode is built in an LSI.

It is to be noted that the source terminal of the main NMOS transistor is a terminal provided at side opposite to a terminal connected to the input power source. That is, the source terminal of the main NMOS terminal corresponds to a terminal to which a choke-coil or the like as well as the first capacitance is connected.

The above and further objects will more fully appear from the following detailed description when the same is read in connection with the accompanying drawing it is to be understood, however, that the drawings are form the purpose of illustration only and are not intended as a definition of the limits of the invention.

BRIEF DESCRIPTION OF THE DRAWINGS

FIG. 5 is a circuit diagram showing structure of a DC-DC converter directed to a second embodiment;

FIG. 6 is a circuit diagram showing structure of a DC-DC converter directed to a third embodiment;

FIG. 7 is an exemplary diagram showing circuit operation coping with state of each FET;

FIG. 8 is an exemplary diagram showing circuit operation coping with state of each FET;

FIG. 9 is an exemplary diagram showing generation of gate voltage of FET1;

FIG. 10 is a circuit diagram showing structure of a DC-DC converter directed to a fourth embodiment;

DETAILED DESCRIPTION OF THE PREFERRED EMBODIMENTS

Preferred embodiments of an amplifier or the invention are described specifically below by referring to FIG. 1 to FIG. 14.

First Preferred Embodiment

Figure 1:
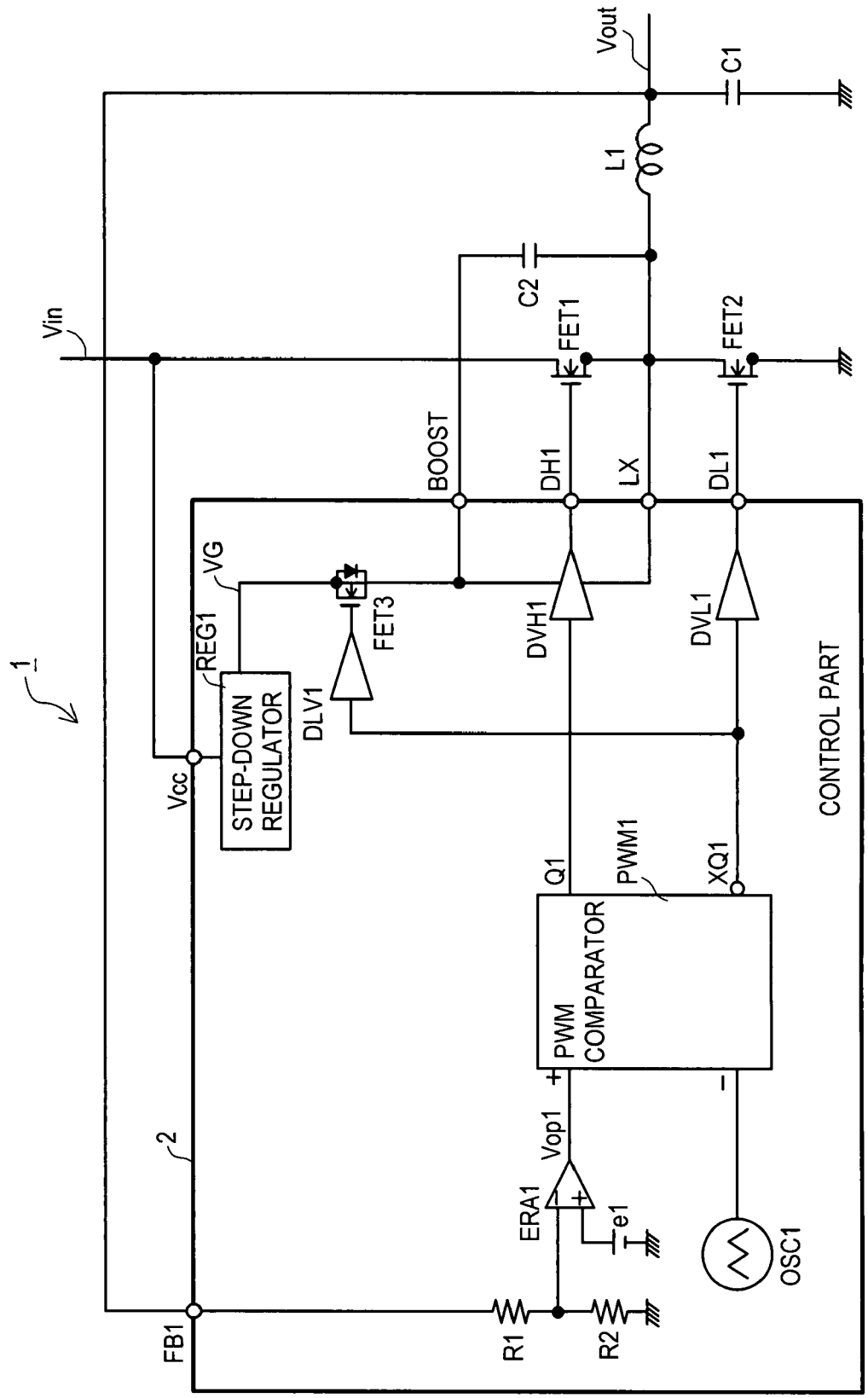
FIG. 1 is a circuit diagram showing structure of a DC-DC converter directed to a first embodiment.

FIG. 1 is a circuit diagram of a DC-DC converter in a first preferred embodiment. The DC-DC converter 1 comprises a control part 2 built in a one-chip semiconductor device, a main NMOS transistor FET1, a synchronous rectifier NMOS transistor FET2, a smoothing capacitor C1, a capacitor C2, and a choke coil L1.

The control part 2 includes potential resistances R1, R2, an error amplifier ERA1, a triangular wave oscillator OSC1, a PWM comparator PWM1, drivers DVH1, DVL1, DLV1, and a step-down regulator REG1, and is designed to control the main NMOS transistor FET1 and the synchronous rectifier NMOS transistor FET2. Operation and connection for the PWM comparator PWM1 for outputting output signals Q1, XQ1 are same as in the DC-DC converter 100, and detail is omitted.

In the source of the main NMOS transistor FET1, one end of the capacitor C2 is connected. The other end of the capacitor C2 is connected to the terminal BOOST of the control part 2. The terminal BOOST is connected to the power source terminal of the driver DVH1, and one source-drain terminal of the NMOS transistor FET3. At the one source-drain terminal of the NMOS transistor FET3, the output signal XQ1 is connected by way of the driver DLV1. At the other source-drain terminal of the NMOS transistor FET3, a back gate terminal is connected, and it is further connected to the output of the step-down regulator REG1. Since the back gate terminal is connected to other source-drain terminal, a parasitic diode occurring between the one source-drain terminal and the back terminal is connected in a direction of the forward direction of charging the capacitor C2. As a result, if the potential of the terminal BOOST becomes larger than the voltage VG of the output of the step-down regulator, counterflow can be prevented.

The step-down regulator REG1 is composed of a linear regulator, and the step-down regulator REG1 outputs a voltage lower than the power source input voltage Vin. Accordingly, the NMOS transistor FET3 conducts securely at a high level at the same potential as the power source input voltage Vin outputted from the driver DLV1, and the potential of the step-down regulator REG1 can be transmitted to the terminal BOOST.

Figure 2:
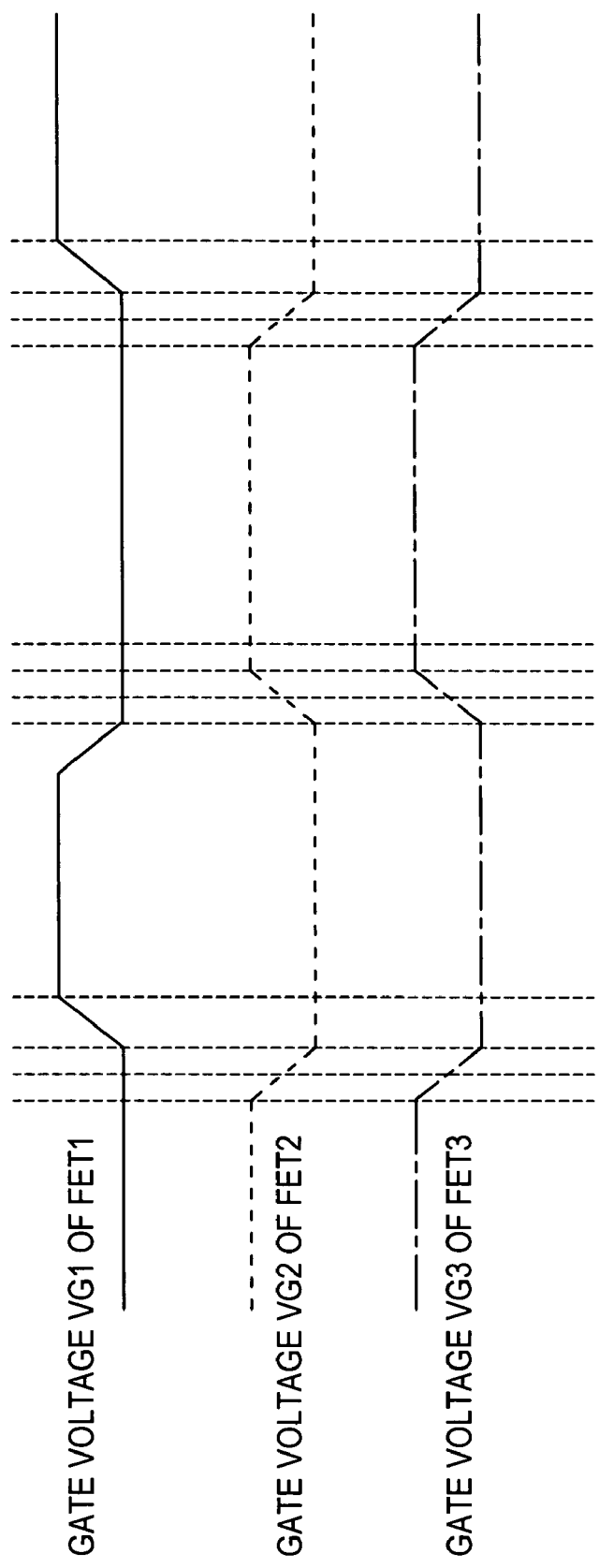
FIG. 2 is a timing chart showing timing of FET1 thorough FET3.
Figure 3:
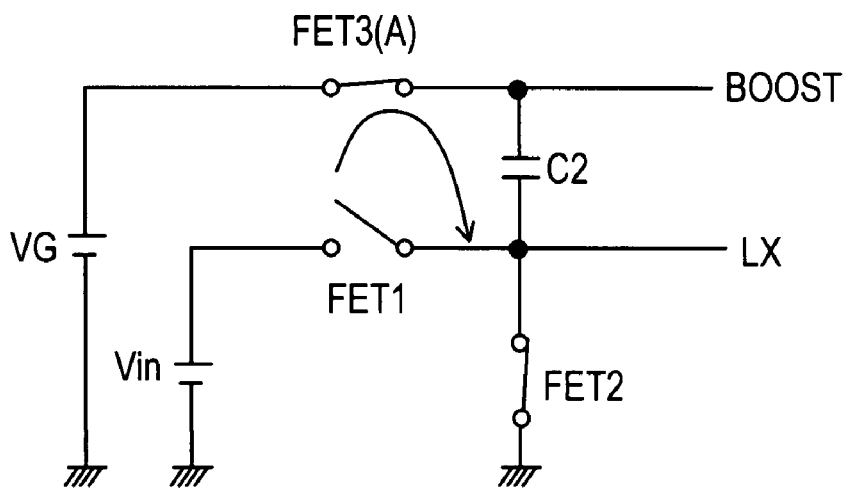
FIG. 3 is an exemplary diagram showing circuit operation coping with state of each FET.
Figure 4:
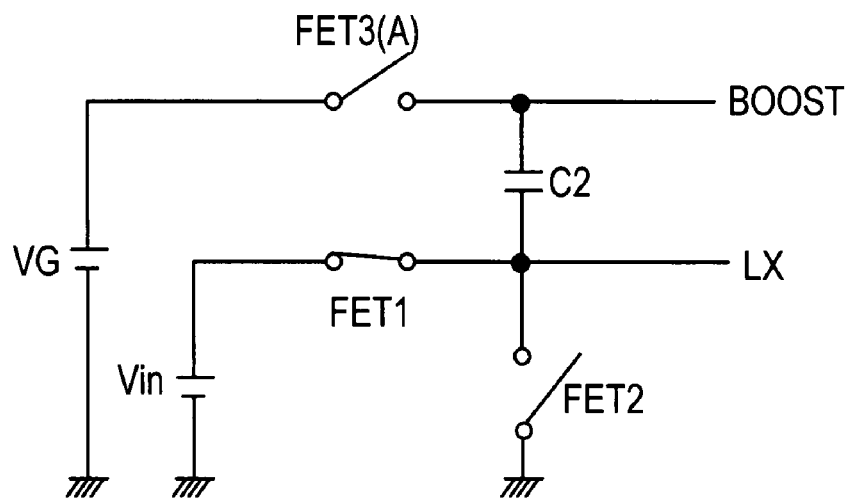
FIG. 4 is an exemplary diagram showing circuit operation coping with state of each FET.

Next, with reference to FIG. 2 to FIG. 4, the operation of the DC-DC converter 1 is explained. FIG. 2 is a timing chart showing the timing of the main NMOS transistor FET1, the synchronous rectifier NMOS transistor FET2, and the NMOS transistor FET3, and FIG. 3 and FIG. 4 are schematic diagrams showing circuit operations depending on the states of the main NMOS transistor FET1, the synchronous rectifier NMOS transistor FET2, and the NMOS transistor FET3.

As shown in FIG. 2, a gate voltage VG3 of the NMOS transistor FET3 is controlled in anti-phase to a gate voltage VG1 of the main NMOS transistor FET1, and is controlled in in-phase as a gate voltage VG2 of the synchronous rectifier NMOS transistor FET2.

In FIG. 3, when the output signal Q1 of the PWM comparator PWM1 is at a low level and the output signal XQ1 is at a high level, the main NMOS transistor FET1 does not conduct, the synchronous rectifier NMOS transistor FET2 conducts, and the NMOS transistor FET3 conducts. As a result, in the capacitor C2, one terminal is connected to the voltage VG of the NMOS transistor FET3, and the other terminal is connected to the grounding potential by way of the synchronous rectifier NMOS transistor FET2, and hence the both ends of the capacitor C2 are charged to a potential of the voltage VG. When the NMOS transistor FET3 conducts, there is almost no conduction resistance, and the current consumed by the NMOS transistor FET3 is almost zero.

Next, when the output signal Q1 of the PWM comparator PWM1 is changed to a high level and the output signal XQ1 to a low level, the main NMOS transistor FET1 conducts, the synchronous rectifier NMOS transistor FET2 does not conduct, and the NMOS transistor FET3 does not conduct. As a result, the potential of the terminal LX elevates to the power source input voltage Vin, and by capacitive coupling of the capacitor C2, the potential of the terminal BOOST elevates up to the potential of the power source input voltage Vin+the voltage VG. Through the driver DVH1, consequently, a voltage of the power source input voltage Vin+the voltage VG is applied to the gate terminal of the main NMOS transistor FET1, and the main NMOS transistor FET1 securely operates in conduction.

By this operation, when charging the capacitor C2 by way of the NMOS transistor FET3, power consumption hardly occurs in the NMOS transistor FET3. Hence an efficient DC-DC converter not requiring external diode is realized.

Second Preferred Embodiment

Next, with reference to FIG. 5, a DC-DC converter 1A in a second preferred embodiment is explained. FIG. 5 is a circuit diagram of the DC-DC converter 1A in the second preferred embodiment. It is similar to the DC-DC converter 1 in the first preferred embodiment, except that a PMOS transistor FET3A is used instead of the NMOS transistor FET3, that an inverter NOT1 is provided instead of the driver DLV1 in a former stage, and that the step-down regulator REG1 is omitted. Only the different portions are described specifically, and same parts are described briefly or omitted.

The voltage VG is connected to the power source input voltage Vin, and is connected to one source-drain terminal of the PMOS transistor FET3A. In the other source-drain terminal of the PMOS transistor FET3A, a back gate is connected, and it is further connected to the terminal BOOST. Since the back gate terminal is connected to the other source-drain terminal, the parasitic diode occurring between the one source-drain terminal and the back gate is connected in a forward direction of charging the capacitor C2. As a result, if the potential of the terminal BOOST becomes larger than the voltage VG of the output of the step-down regulator, counterflow can be prevented.

The output of the inverter NOT1 is connected to the gate terminal of the PMOS transistor FET3A. The terminal BOOST is connected to the power source terminal of the inverter NOT1. As a result, at the time of output of the inverter NOT1 at a high level, the potential is the same between the gate terminal and one source-drain terminal of the PMOS transistor FET3A, and the PMOS transistor FET3A does not conduct securely.

The DC-DC converter 1A operates in the same manner as the DC-DC converter 1 in the first preferred embodiment. With reference to FIG. 3 and FIG. 4, the operation of DC-DC converter 1A is explained.

In FIG. 3, when the output signal Q1 of the PWM comparator PWM1 is at a low level and the output signal XQ1 is at a high level, the main NMOS transistor FET1 does not conduct, the synchronous rectifier NMOS transistor FET2 conducts, and the PMOS transistor FET3A conducts. As a result, in the capacitor C2, one terminal is connected to the voltage VG of the PMOS transistor FET3A, and the other terminal is connected to the grounding potential by way of the synchronous rectifier NMOS transistor FET2, and hence the both ends of the capacitor C2 are charged to a potential of the voltage VG. When the PMOS transistor FET3A conducts, there is almost no conduction resistance, and the current consumed by the PMOS transistor FET3A is almost zero.

Next, when the output signal Q1 of the PWM comparator PWM1 is changed to a high level and the output signal XQ1 to a low level, the main NMOS transistor FET1 conducts, the synchronous rectifier NMOS transistor FET2 does not conduct, and the PMOS transistor FET3A does not conduct. As a result, the potential of the terminal LX elevates to the power source input voltage Vin, and by capacitive coupling of the capacitor C2, the potential of the terminal BOOST elevates up to the potential of the power source input voltage Vin+the voltage VG. Through the driver DVH1, consequently, a voltage of power source input voltage Vin+the voltage VG is applied to the gate terminal of the main NMOS transistor FET1, and the main NMOS transistor FET1 securely operates in conduction.

By this operation, when charging the capacitor C2 by way of the PMOS transistor FET3A, power consumption hardly occurs in the PMOS transistor FET3A. Hence an efficient DC-DC converter not requiring external diode can be realized. Besides, when the step-down regulator REG1 is not used, the circuit configuration is simpler than that of the DC-DC converter 1 in the first preferred embodiment.

Third Preferred Embodiment

Next, with reference to FIG. 6, a DC-DC converter 1B in a third preferred embodiment is explained. FIG. 6 is a circuit diagram of the DC-DC converter 1B in the third preferred embodiment. The DC-DC converter 1B is similar to the DC-DC converter 1A in the second preferred embodiment, except that a capacitor C3 is provided between a terminal LX and a voltage VG, and that a control part 2B includes a PMOS transistor FET4, a logic gate NAND1, a voltage comparator COMP1, and a reference voltage e2. Other parts are the same as in the DC-DC converter 1A in the second preferred embodiment, and only the different portions are described specifically, and same parts are described briefly or omitted.

The PMOS transistor FET4 is a switching circuit for conducting and not conducting the parallel connection between the capacitor C3 connected between the voltage VG and the terminal LX, and the capacitor C2 connected between the terminal BOOST and the terminal LX. Since one source-drain terminal is connected to the back gate terminal, the parasitic diode occurring between the other source-drain terminal and the back terminal is connected in a reverse direction from the voltage VG to the terminal BOOST. As a result, if the potential of the capacitor C3 is higher than the potential of the capacitor C2, when the PMOS transistor FET4 does not conduct, leakage of charge from the capacitor C3 to the capacitor C2 is prevented.

The voltage comparator COMP1 is a voltage comparator for monitoring the voltage of the capacitor C2 connected between the terminal BOOST and the terminal LX, and at the time of non-inverting input, the reference voltage e2 is connected, and the output of the capacitor C2 is connected to the inverting input. At the logic gate NAND1, the output of this voltage comparator COMP1 is connected to one end, and the output signal Q1 of the PWM comparator PWM1 is connected to the other end. The output of the logic gate NAND1 is connected to the gate terminal of the PMOS transistor FET4.

The voltage VG is inputted to the inverter NOT1 and the power source terminal of the logic gate NAND1. Accordingly, while the potential is at a high level in the gate terminals of the PMOS transistor FET3A and the PMOS transistor FET4, the PMOS transistor FET3A and the PMOS transistor FET4 do not conduct securely.

With reference to FIG. 7 to FIG. 9, the operation of the DC-DC converter 1B in the third preferred embodiment is explained below. FIG. 7 and FIG. 8 are schematic diagrams showing the operation of the circuit corresponding to the operation of each FET. As shown in FIG. 7, when the main NMOS transistor FET1 does not conduct, the synchronous rectifier NMOS transistor FET2 and the PMOS transistor FET3A conduct, and the potential of the source terminal of the main NMOS transistor FET1 is the grounding potential, and the capacitor C3 is charged up to the power source input voltage Vin. On the other hand, when the main NMOS transistor FET1 does not conduct, the output signal Q1 of the PWM comparator PWM1 is at a low level, and the logic gate NAND1 outputs a high level output, and the PMOS transistor FET4 does not conduct. Therefore, connection of the capacitor C2 is cut off from the capacitor C3, and the capacitor C2 is not charged.

Next, as shown in FIG. 8, when the synchronous rectifier NMOS transistor FET2 does not conduct and the main NMOS transistor FET1 conducts, the source potential of the main NMOS transistor FET1 elevates up to the power source input voltage Vin. As a result, by capacitive coupling, the potential of the capacitor C3 is elevated to about 2 times of the power source input voltage Vin. However, when synchronizing with the synchronous rectifier NMOS transistor FET2, the PMOS transistor FET3A does not conduct, and if the potential of the capacitor C3 is higher than the power source input voltage Vin, counter-flow from the capacitor C3 to the power source input voltage Vin can be prevented.

On the other hand, when the main NMOS transistor FET1 conducts, the output signal Q1 of the PWM comparator PWM1 is at high level, and when the potential of the capacitor C2 is lower than the reference voltage e2, a low level is outputted to the output of the logic gate NAND1. As a result, the PMOS transistor FET4 conducts, and the capacitor C2 and the capacitor C3 are connected in parallel, and the capacitor C2 is charged by the capacitor C3.

At this time, if the potential of the capacitor C2 is higher than the reference voltage e2, the output of the voltage comparator COMP1 is at a low level, and one end of the logic gate NAND1 is at low level, and a high level is outputted to the logic gate NAND1. As a result, the parallel connection of the capacitor C2 and the capacitor C3 is cut off, and the capacitor C2 is not charged by the capacitor C3.

FIG. 9 is a schematic diagram showing generation of the gate voltage of the main NMOS transistor FET1 in the DC-DC converter 1B. In this context, the switch SW is a changeover circuit by the PMOS transistor FET3A and the PMOS transistor FET4 in the DC-DC converter 1B. When the switch SW is connected to the power source input voltage Vin side, the charge Q accumulated in the capacitor C3 is indicated as $Q=C2\times Vin.$ When the switch SW is connected to the capacitor C2 side, the charge accumulated in the capacitor C3 is moved to the capacitor C2, but since the total quantity of the charge Q is not changed, supposing the voltage of the terminal BOOST to be VBOOST, the charge is indicated as $Q=(C2+C3)\times VBOOST$ Therefore, the output side voltage VBOOST is as follows.

$VBOOST=C2/(C2+C3)\times Vin$

Accordingly, the voltage VBOOST of the terminal BOOST can be set lower than Vin, and the main NMOS transistor FET1 conducts, and the voltage (Vin+VBOOST) when the source voltage becomes the power source input voltage Vin can be set at a low voltage. Therefore, the voltage applied to the gate terminal of the main NMOS transistor FET1 can be set at a voltage lower than that when the voltage VBOOST is equal to the power source input voltage Vin, and the power loss can be suppressed at the gate terminal of the main NMOS transistor FET1. By defining in the relation of the capacitor C2 capacity value to be larger than the capacitor C3 capacity value, it is desirable because the voltage VBOOST can be set at a lower voltage.

When the main NMOS transistor FET1 conducts and the source voltage becomes the power source input voltage Vin, the lower limit of the voltage is Vin+Vth (Vth is the threshold voltage of the main NMOS transistor FET1).

Fourth Preferred Embodiment

With reference to FIG. 10, a DC-DC converter 1C is explained. FIG. 10 is a circuit diagram of a DC-DC converter 1C.

In the DC-DC converters in the first to the third preferred embodiment, when the main NMOS transistor FET1 conducts and the grounding potential is changed to the power source input voltage Vin, by capacitive coupling of the charge pump, a voltage higher than the power source input voltage Vin is generated. Accordingly, when the conduction of the main NMOS transistor FET1 is 100%, the charge pump does not operate, and a voltage higher than power source input voltage Vin cannot be generated in the terminal BOOST. The DC-DC converter 1C operates the charge pump even when the conduction of the main NMOS transistor FET1 at 100% duty, in the case that the converter is the one of switching regulator systems.

In the DC-DC converter 1C, a control part 2C includes an oscillator OSC2 for operating the charge pump not synchronously with the conduction operation of the main NMOS transistor FET1, a step-down regulator REG1, PMOS transistors FET3A, FET4, FET6, and an NMOS transistor FET5. Same reference numerals as in the first preferred embodiment to the third preferred embodiment are the same components, and the explanation is omitted. To the output of the step-down regulator REG1, one source-drain terminal of the PMOS transistor FET3A is connected, and the other source-drain terminal of the PMOS transistor FET3A is connected to one source-drain terminal of the PMOS transistor FET4, and the power source terminal of the driver DVH1 is connected to the other source-drain terminal of the PMOS transistor FET4.

The grounding potential is connected to one source-drain terminal of the NMOS transistor FET5, and the other source-drain terminal of the NMOS transistor FET5 is connected to one source-drain terminal of the PMOS transistor FET6, and the other source-drain terminal of the PMOS transistor FET6 is connected to the grounding power source terminal of the driver DVH1.

The output of the oscillator OSC2 for driving the charge pump is connected to the input terminal of the inverter NOT1, and the gate terminals of PMOS transistors FET4, FET6, FET5. The output of the inverter NOT1 is outputted to the gate terminal of the PMOS transistor FET3A. Accordingly, when the oscillator OSC2 outputs a high level, the PMOS transistor FET3A and the NMOS transistor FET5 conduct, while the PMOS transistors FET4, FET6 do not conduct. On the other hand, when the oscillator OSC2 outputs a low level, the PMOS transistor FET3A and the NMOS transistor FET5 do not conduct, while the PMOS transistors FET4, FET6 conduct.

The outside of the control part 2, the main NMOS transistor FET1 is connected between the power source input voltage Vin and the terminal LX, and the synchronous rectifier NMOS transistor FET2 is connected between the terminal LX and the grounding potential. Further, the capacitor C2 is connected between the terminal BOOST of the PMOS transistor FET4 and the driver DVH1, and the terminal LX, and the capacitor C3 is connected between the terminal BOOST2 of the PMOS transistor FET3A and PMOS transistor FET4, and the terminal BOOST3 of the NMOS transistor FET5 and the PMOS transistor FET6.

With reference to FIG. 11 to FIG. 14, the operation of the DC-DC converter 1C in the fourth preferred embodiment is described below. FIG. 11 to FIG. 14 are schematic diagrams showing the circuit operation corresponding to the state of each FET.

Figure 11:
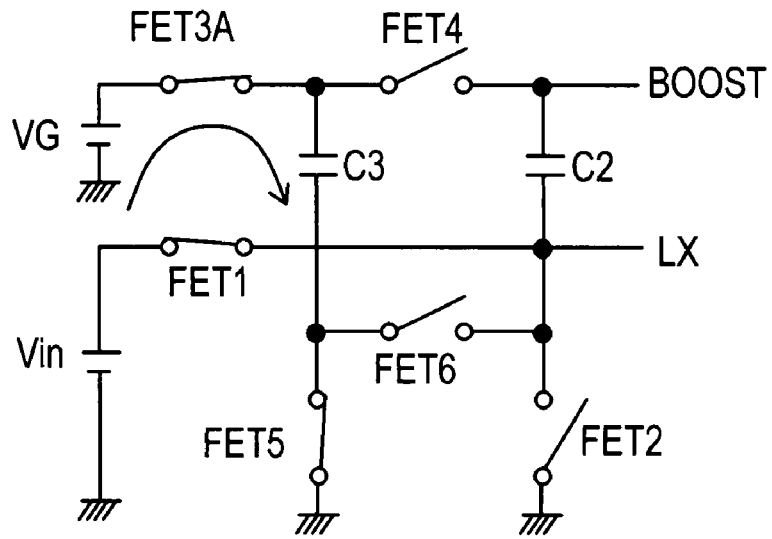
FIG. 11 is an exemplary diagram showing circuit operation coping with state of each FET.
Figure 12:
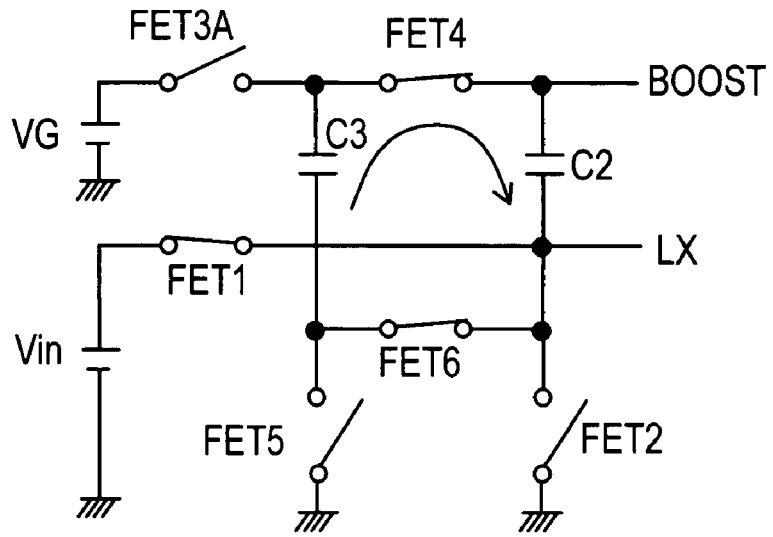
FIG. 12 is an exemplary diagram showing circuit operation coping with state of each FET.
Figure 13:
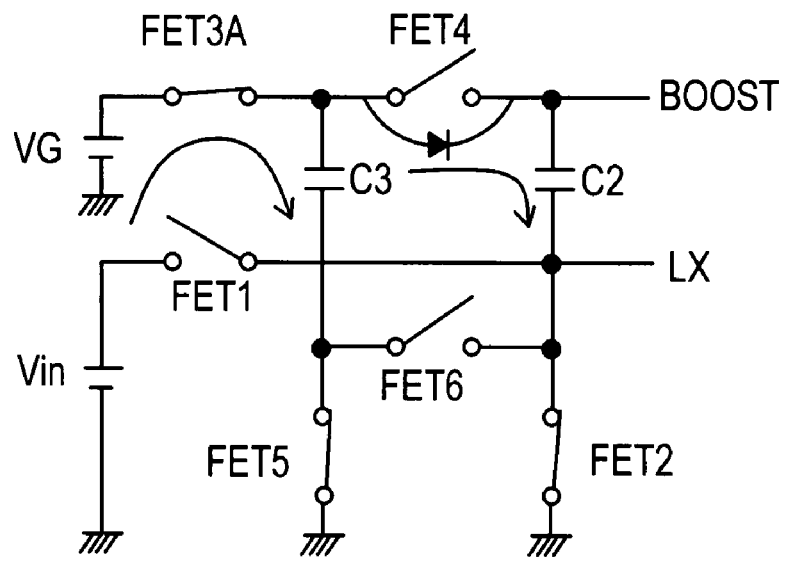
FIG. 13 is an exemplary diagram showing circuit operation coping with state of each FET.
Figure 14:
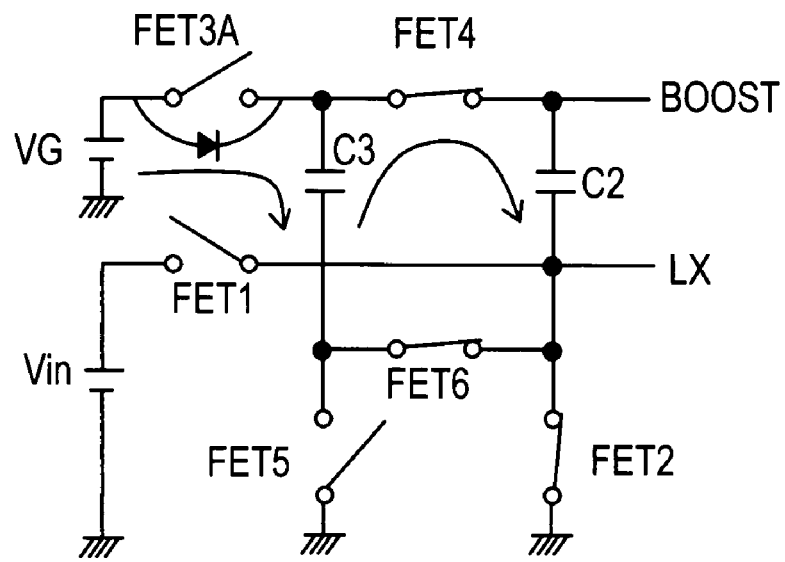
FIG. 14 is an exemplary diagram showing circuit operation coping with state of each FET.
Figure 15:
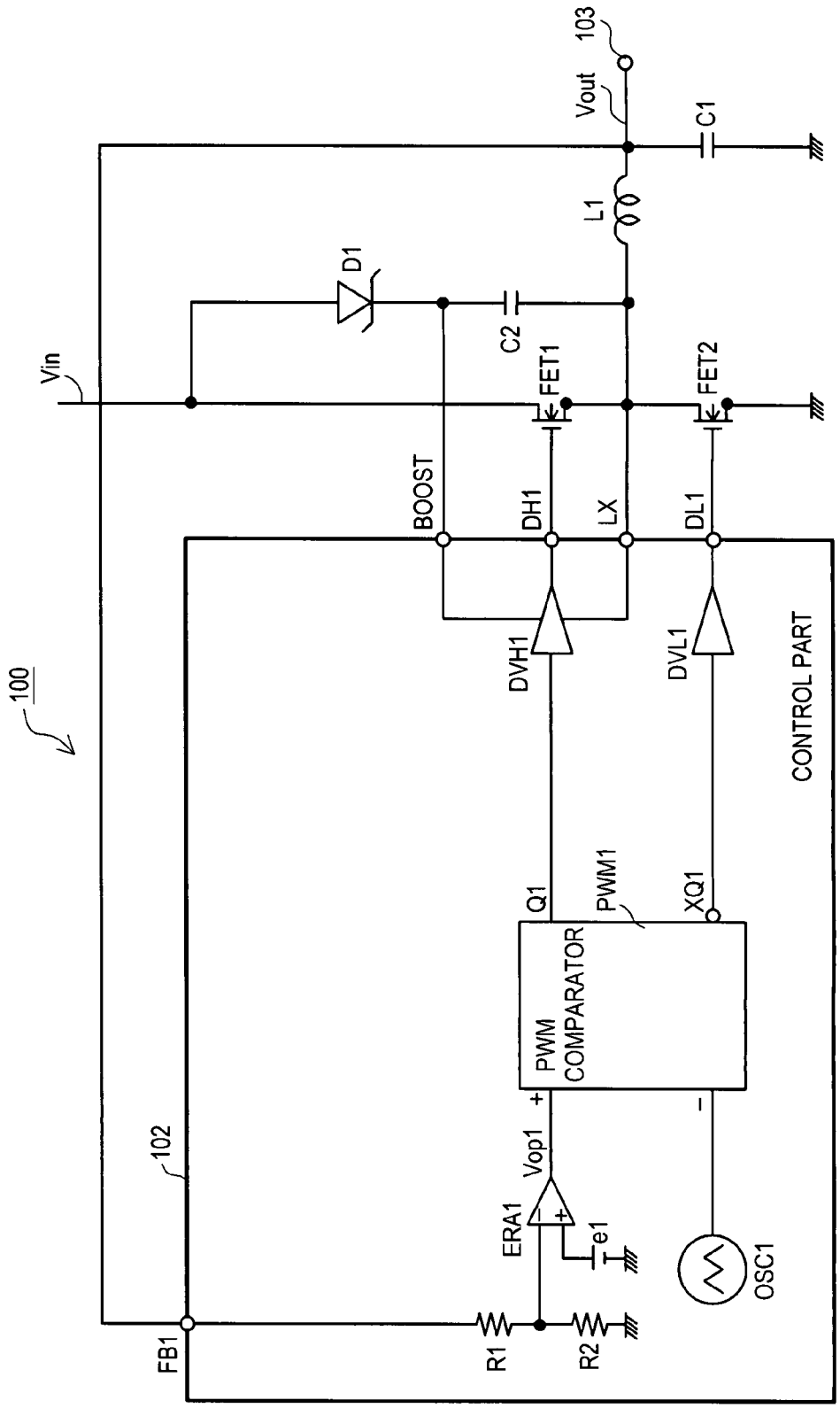
FIG. 15 is a circuit diagram showing structure of a conventional DC-DC converter.
Figure 16:
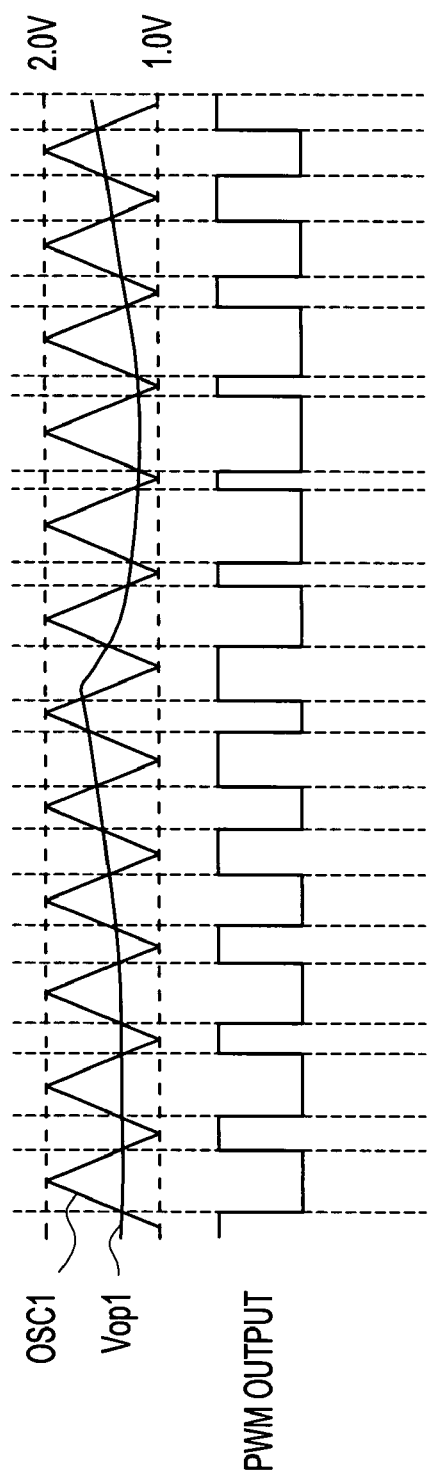
FIG. 16 is a timing chart showing operation wave of a control part in a DC-DC converter.

In FIG. 11 and FIG. 12, the main NMOS transistor FET1 is conducting, and the synchronous rectifier NMOS transistor FET2 is not conducting, and in FIG. 13 and FIG. 14, the main NMOS transistor FET1 is not conducting, and the synchronous rectifier NMOS transistor FET2 is conducting.

First, with reference to FIG. 11 and FIG. 12, the circuit operation is explained when the main NMOS transistor FET1 is conducting, and the synchronous rectifier NMOS transistor FET2 is not conducting.

When the output of the oscillator OSC2 is at a high level, as shown in FIG. 11, the PMOS transistor FET3A and the NMOS transistor FET5 conduct, while the PMOS transistors FET4, FET6 do not conduct. Accordingly, the capacitor C3 is charged by the voltage VG from the step-down regulator REG1 by way of the PMOS transistor FET3A and the NMOS transistor FET5. At this time, the capacitor C2 is not charged because the PMOS transistor FET6 is not conducting, and the grounding potential side is not connected.

Next, when the output of the oscillator OSC2 is at a low level, as shown in FIG. 12, the PMOS transistor FET3A and the NMOS transistor FET5 do not conduct, while the PMOS transistors FET4, FET6 conduct. Accordingly, the capacitor C3 and the capacitor C2 are connected in parallel, and the capacitor C2 is charged by the charge of the capacitor C3. The capacitor C2 and the capacitor C3 are cut off from the grounding potential by the NMOS transistor FET5, and are not charged by the voltage VG from the step-down regulator REG1.

By repeating the operation shown in FIG. 11 and FIG. 12, the capacitor C2 is charged up to the voltage of the voltage VG from the step-down regulator REG1.

Next, with reference to FIG. 13 and FIG. 14, the circuit operation is explained when the main NMOS transistor FET1 is not conducting, and the synchronous rectifier NMOS transistor FET2 is conducting.

When the output of the oscillator OSC2 is at a high level, as shown in FIG. 13, the PMOS transistor FET3A and the NMOS transistor FET5 conduct, while the PMOS transistors FET4, FET6 do not conduct, and the capacitor C3 is charged by the voltage VG from the step-down regulator REG1 by way of the PMOS transistor FET3A and the NMOS transistor FET5. On the other hand, since the synchronous rectifier NMOS transistor FET2 is conducting, and the capacitor C2 is connected to the grounding potential, and even if the PMOS transistor FET4 is not conducting, the capacitor C2 is also charged by the voltage VG from the step-down regulator REG1 by way of the parasitic diode of the PMOS transistor FET4.

Next, when the output of the oscillator OSC2 is at low level, as shown in FIG. 14, the PMOS transistor FET3A and the NMOS transistor FET5 do not conduct, while the PMOS transistors FET4, FET6 conduct, and the capacitor C2 and the capacitor C3 are connected in parallel. The synchronous rectifier NMOS transistor FET2 is conducting, and the capacitor C2 and the capacitor C3 are connected to the grounding potential. If the NMOS transistor FET3 is not conducting, the capacitor C2 and the capacitor C3 are charged by the voltage VG from the step-down regulator REG1 by way of the parasitic diode of the NMOS transistor FET3.

As explained above, regardless of the state of the main NMOS transistor FET1 and the synchronous rectifier NMOS transistor FET2, the capacitor C2 can be charged with the voltage VG from the step-down regulator REG1, and the DC-DC converter can operate even if the conduction of the main NMOS transistor FET1 is in 100% duty.

The invention is not limited to the illustrated embodiments alone, but may be changed and modified within the scope not departing from the true spirit of the invention.

For example, in the first to fourth preferred embodiments, the control part is composed of a single semiconductor device, but may be composed of a plurality of semiconductor devices. The main NMOS transistor FET1 and the synchronous rectifier NMOS transistor FET2 in first to fourth preferred embodiments may be independent discrete power devices, or may be mounted on the control part as one-chip semiconductor device. The DC-DC converters 1 to 1C and control parts 2 to 2C may be composed as modules. The DC-DC converters 1 to 1C in the first to fourth preferred embodiments may be applicable to various power source devices.

The capacitor C2 is an example of first capacity, the NMOS transistors FET3 and the PMOS transistors FET3A are examples of a first switching element, and the PMOS transistor FET3A is an example of the PMOS transistor and the first PMOS transistor. The driver DLV1 is an example of the driving circuit, the inverter NOT1 is an example of the first driving circuit, the reference voltage e2, the voltage comparator COMP1, and the logic gate NAND1 are examples of the second switching device control part, the PMOS transistor FET4 is an example of the second switching device and the second PMOS transistor, and the logic gate NAND1 is an example of the second driving circuit.

The invention hence presents a DC-DC converter efficient in conversion and not requiring external diode.

What is claimed is:

1. A DC-DC converter comprising:
   a main NMOS transistor constituting a main switching device;
   a driver for driving a gate terminal of the main NMOS transistor;
   a first capacitance connected between a source terminal of the main NMOS transistor and a power source terminal of the driver; and
   a first switching device connected between a path to reach an input power source and the power source terminal of the driver;
   wherein the first switching device is made non-conductive when the main NMOS transistor is conductive, and the first switching device is made conductive when the main NMOS transistor is non-conductive.

2. The DC-DC converter according to claim 1 wherein the first switching device is an NMOS transistor of which back gate terminal is connected to a terminal at side of the path to reach the input power source.

3. The DC-DC converter according to claim 2 further comprising a step-down regulator for stepping down input voltage supplied from the input power source, the step-down regulator being arranged between the input power source and the first switching device.

4. The DC-DC converter according to claim 3, wherein a lower bound value of output voltage of the step-down regulator is threshold voltage of the main NMOS transistor.

5. The DC-DC converter according to claim 1 wherein the first switching device is a PMOS transistor of which back gate terminal is connected to a terminal at side of a power source terminal of the driver.

6. The DC-DC converter according to claim 5 further comprising a driving circuit for driving a gate terminal of the PMOS transistor, the driving circuit being constituted by connecting the power source terminal to the power source terminal of the driver.

7. The DC-DC converter according to claim 1 further comprising:
   a second switching device arranged between the first switching device and a connection point of the power source terminal of the driver and the first capacitance;
   a second capacitor connected between a connection point of the first switching device and the second switching device and a source terminal of the main NMOS transistor; and
   a second switching device control part for making the second switching device conductive when conduction command of the main NMOS transistor is in an active state and between-terminal voltage of the first capacitance is predetermined voltage or lower.

8. The DC-DC converter according to claim 7, wherein the first switching device is a first PMOS transistor of which a back gate terminal is connected to a terminal at side of the power source terminal of the driver.

9. The DC-DC converter according to claim 8 further comprising a first driving circuit for driving a gate terminal of the first PMOS transistor, the first driving circuit being constituted by connecting a power source terminal of the first driving circuit to a connection point of the first switching device and the second switching device.

10. The DC-DC converter according to claim 7, wherein the first switching device is a first NMOS transistor of which a back gate terminal is connected to a terminal at side of the path to reach the input power source.

11. The DC-DC converter according to claim 7, wherein the second switching device is a second PMOS transistor of which a back gate terminal is connected to a terminal at side of the power source terminal of the driver.

12. The DC-DC converter according to claim 11 further comprising a second driving circuit for driving a gate terminal of the second PMOS transistor, the second driving circuit being constituted by connecting a power source terminal of the second driving circuit to a connection point of the first switching device and the second switching device.

13. The DC-DC converter according to claim 7, wherein the second switching device is a second NMOS transistor of which a back gate terminal is connected to a terminal at side of the path to reach the input power source.

14. The DC-DC converter according to claim 7, wherein capacity of the first capacitor is larger than capacity of the second capacitor.

* * * * *